United States Patent Office 3,780,081
Patented Dec. 18, 1973

3,780,081
1-(CYANOALKOXY) PHENOXY-3-AMINO-2-PROPANOLS
David James Le Count and Christopher John Squire, Macclesfield, England, assignors to Imperial Chemical Industries Limited, London, England
No Drawing. Filed May 1, 1972, Ser. No. 248,809
Claims priority, application Great Britain, May 7, 1971, 13,720/71
Int. Cl. C07c *121/78*
U.S. Cl. 260—465 E        6 Claims

ABSTRACT OF THE DISCLOSURE

New 1-amino-3-cyanoalkoxyphenoxy- or 3-acylalkoxyphenoxy-2-propanol derivatives, processes for their manufacture and pharmaceutical compositions containing them. The compounds possess β-adrenergic blocking activity and are useful in the treatment of heart diseases and other conditions in man. Representative of the compounds disclosed is 1-m-(3-cyanopropoxy)phenoxy - 3 - isopropylamino-2-propanol.

---

This invention relates to new alkanolamine derivatives which possess β-adrenergic blocking activity.

According to the invention there is provided a new alkanolamine derivative of the formula:

$$R^2A-O-\underset{R^3}{\underbrace{C_6H_3}}-OCH_2 \cdot CHOH \cdot CH_2NHR^1$$

wherein $R^1$ stands for an alkyl, hydroxyalkyl or cycloalkyl radical each of up to 6 carbon atoms; wherein $R^2$ stands for the cyano radical or for an acyl radical of up to 6 carbon atoms; wherein $R^3$ stands for hydrogen or for a halogen atom or for an alkyl, alkenyl, alkoxy or alkenyloxy radical each of up to 6 carbon atoms; and wherein A stands for an alkylene radical of up to 6 carbon atoms; or an acid-addition salt thereof.

It is to be understood that the alkanolamine derivative of the invention possesses an asymmetric carbon atom, namely the carbon atom of the —CHOH— group in the alkanolamine side-chain, and it may therefore be resolved into optically-active enantiomorphic forms. At least one, and possibly both, of these enantiomorphic forms will possess β-adrenergic blocking activity. It is to be understood, therefore, that this invention encompasses the racemic form of the alkanolamine derivative and any enantiomorphic form which possesses β-adrenergic blocking activity. It is to be understood that β-adrenergic blocking activity usually predominates in that enantiomorphic form which has the "S" absolute configuration of the said —CHOH— group.

Preferably the alkyl or hydroxyalkyl radical $R^1$ contains 3 or 4 carbon atoms and is branched at the α-carbon atom. $R^1$ may be, for example, the isopropyl, s-butyl, t-butyl, 2-hydroxy-1-methylethyl, 2 - hydroxy-1,1-dimethylethyl, cyclopropyl, cyclobutyl, cyclopentyl or cyclohexyl radical.

A suitable value for $R^2$ when it stands for an acyl radical is, for example, the acetyl or propionyl radical.

A suitable value for $R^3$ when it stands for a halogen atom is, for example, the fluorine, chlorine, bromine or iodine atom.

A suitable value for $R^3$ when it stands for an alkyl, alkenyl, alkoxy or alkenyloxy radical is, for example, the methyl, ethyl, n-propyl, allyl, methoxy, isopropoxy or allyloxy radical.

The alkylene radical A may have 1 to 4 carbon atoms. A suitable value for A is, for example, the methylene, trimethylene, tetramethylene, pentamethylene or ethylidene $$\left(-\underset{CH_3}{\underset{|}{CH}}-\right)$$

radical.

A suitable acid-addition salt of an alkanolamine derivative of the invention, is, for example, a salt derived from an inorganic acid, for example a hydrochloride, hydrobromide, phosphate or sulphate, or a salt derived from an organic acid, for example an oxalate, lactate, tartrate, acetate, salicylate, citrate, benzoate, β-naphthoate, adipate or 1,1-methylene-bis-(2-hydroxy-3-naphthoate), or a salt derived from an acidic synthetic resin, for example a sulphonated polystyrene resin, for example "Zeo-Karb" 225 ("Zeo-Karb" is a trademark).

A preferred group of alkanolamine derivatives of the invention comprises compounds of the formula given above wherein $R^1$ stands for the isopropyl or t-butyl radical, $R^2$ stands for the cyano radical, $R^3$ stands for hydrogen and A stands for a straight-chain alkylene radical of 3 to 5 carbon atoms, and the acid-addition salts thereof.

Specific alkanolamine derivatives of the invention are those hereinafter described in the examples. Of these, preferred compounds by virtue of their high β-adrenergic blocking activity are 1-o-(3-cyanopropoxy)phenoxy-3-isopropylamino - 2 - propanol; 1-m-(3-cyanopropoxy)phenoxy-3-isopropylamino-2-propanol and 1-p-(3-cyanopropoxy)phenoxy-3-isopropylamino-2-propanol and the acid-addition salts thereof.

The alkanolamine derivative of the invention may be manufactured by any chemical process known to be useful for the manufacture of chemically-analogous compounds.

According to a further feature of the invention there is provided a process for the manufacture of the alkanolamine derivative of the invention which comprises assembling in sequence, by chemical synthesis, the five radicals:

(i) An alkylene radical of the formula:

$$R^2—A—$$

wherein $R^2$ and A have the meanings stated above;

(ii) A phenoxy radical of the formula:

$$O-\underset{R^3}{\underbrace{C_6H_3}}-O-$$

wherein $R^3$ has the meaning stated above;

(iii) An oxygenated three carbon radical of the formula:

$$-CH_2 \cdot \underset{\underset{OR^5}{|}}{C}H \cdot CH_2-$$

wherein $R^5$ stands for hydrogen or for a protecting group;

(iv) An imino radical of the formula —$NR^6$—, wherein $R^6$ stands for hydrogen or for a protecting group; and (v) A radical of the formula —$R^1$, wherein $R^1$ has the meaning stated above; whereafter if either or both of $R^5$ and $R^6$ stands for a protecting group, the one or two protecting groups are removed.

The various stages of the assembly may be carried out in any possible order. Thus, for example:

(a) A phenol of the formula:

$$R^2-A-O-\underset{R^3}{\underbrace{C_6H_3}}-OH$$

wherein $R^2$, $R^3$ and A have the meanings stated above, may first be reacted with an oxygenated three-carbon derivative, for example a compound of the formula:

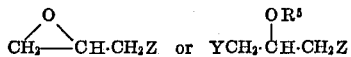

wherein $R^5$ has the meaning stated above, wherein Y stands for a displaceable radical and wherein Z stands for the hydroxy radical or for a displaceable radical. If Z stands for the hydroxy radical, the intermediate compound obtained is further reacted with a reagent which will replace the primary hydroxy radical Z with a displaceable radical Y. The resulting product, which is a compound of the formula:

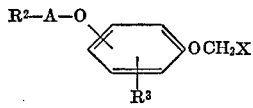

wherein $R^2$, $R^3$ and A have the meanings stated above and wherein X stands for the group

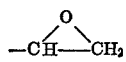

or the group

wherein $R^5$ and Y have the meanings stated above, or which is, when $R^5$ stands for hydrogen, a mixture of such compounds wherein X has both meanings stated above, is then reacted with an amine of the formula $R^1R^6NH$, wherein $R^1$ and $R^6$ have the meanings stated above, or with a precursor of such an amine.

(b) An oxygenated three-carbon derivative, for example a compound of the formula:

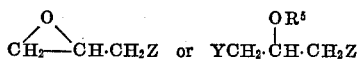

wherein $R^5$, Y and Z have the meanings stated above, is reacted with an amine of the formula $R^1R^6NH$, wherein $R^1$ and $R^6$ have the meanings stated above, or with a precursor of such an amine. If Z stands for the hydroxy radical the intermediate compound obtained is further reacted with a reagent which will replace the primary hydroxy radical Z with a displaceable radical Y. The resulting product, which is a compound of the formula $XCH_2.NR^1R^6$, wherein $R^1$, $R^6$ and X have the meanings stated above, or which is, when $R^5$ stands for hydrogen, a mixture of such compounds wherein X has both meanings stated above, is then reacted with a phenol of the formula:

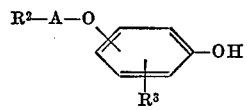

wherein $R^2$, $R^3$ and A have the meanings stated above.

A suitable value for Y, or for Z when it stands for a displaceable radical, is, for example, a halogen atom, for example, the chlorine or bromine atom, or a sulphonyloxy radical, for example an alkanesulphonyloxy radical of up to 6 carbon atoms or an arenesulphonyloxy radical of up to 10 carbon atoms, for example the methanesulphonyloxy, benzene-sulphonyloxy or toluene-p-sulphonyloxy radical.

A suitable reagent which will replace the primary hydroxy radical Z with a displaceable radical Y is, for example, a halogenating agent, for example a thionyl halide, for example thionyl chloride or thionyl bromide, or a sulphonylating agent, for example an alkanesulphonyl halide or an arenesulphonyl halide, for example methanesulphonyl chloride, benzenesulphonyl chloride or toluene-p-sulphonyl chloride.

The reaction involving a phenol reactant may be carried out in the presence of an acid-binding agent, for example an alkali metal hydroxide, for example sodium hydroxide, or an organic base, for example piperidine. Alternatively, an alkali metal derivative of the phenol reactant, for example the sodium or potassium derivative, may be used as starting material. The reaction may be carried out in a diluent or solvent, for example methanol or ethanol, and it may be accelerated or completed by the application of heat, for example by heating to the boiling point of the diluent or solvent.

The reaction involving an amine of the formula $R^1R^6NH$ may be carried out at ambient temperature or it may be accelerated or completed by the application of heat, for example by heating to a temperature of 90–110° C.; it may be carried out at atmospheric or at an elevated pressure, for example by heating in a sealed vessel; and it may be carried out in an inert diluent or solvent, for example methanol or ethanol, or an excess of the amine of the formula $R^1R^6NH$, wherein $R^1$ and $R^6$ have the meanings stated above, may be used as diluent or solvent.

A suitable precursor of the amine of the formula $R^1R^6NH$ is, for example, a urea of the formula $R^1R^6N.CO.NR^1R^6$, wherein $R^1$ and $R^6$ have the meanings stated above. The reaction involving a urea may be carried out in a high boiling diluent or solvent, for example tetralin, Decalin or benzonitrile, and it may be carried out at a temperature of between 150 and 220° C.

(c) The series of reactions described under (a) or (b) above may be carried out except that a phenol of the formula:

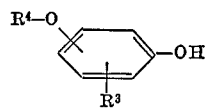

wherein $R^3$ has the meaning stated above and wherein $R^4$ stands for hydrogen or for a protecting group, is used in place of the phenol of the formula:

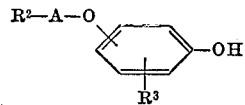

The protecting group $R^4$, if present, is removed and the resulting product, which is a phenolic compound of the formula:

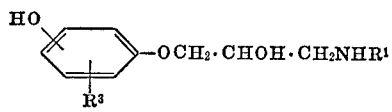

wherein $R^1$ and $R^3$ have the meanings stated above, or a metal salt thereof, is reacted with a compound of the formula:

$R^2$—A—Y wherein $R^2$, A and Y have the meanings stated above.

A suitable metal salt of the starting material is, for example, an alkali metal salt, for example the sodium salt, or the thallium salt. If a metal salt is not used, the reaction may be carried out in the presence of an acid-binding agent. The reaction may be carried out in a diluent or solvent, for example ethanol or dimethylformamide, and it may be accelerated or completed by the application of heat, for example by heating to a temperature of up to 150° C.

(d) The series of reactions described under (a) or (b) or (c) above may be carried out except that an amine of the formula $R^6NH_2$ is used in place of an amine of the formula $R^1R^6NH$, it being understood that when $R^6$ stands for hydrogen the amine is ammonia. The radical $R^1$ may then be inserted as a separate step, for example either by the reaction of the final product from the series of reactions described under (a) or (b) or (c) above with a compound of the formula $R^1Y$, Y wherein $R^1$ and Y have the meanings stated above, or, when $R^6$ stands for hydrogen, by the reaction under reducing conditions of the final product from the series of reactions described under (a) or (b) or (c) above with a carbonyl compound of the formula $R^7.CO.R^8$, wherein $R^7$ stands for an alkyl radical and $R^8$ stands for an alkyl or substituted alkyl radical, or wherein $R^7$ and $R^8$ are joined together with the adjacent carbon atom to form a cycloalkyl radical, such that the radical —$CHR^7R^8$ has the same meaning as is stated above for $R^1$.

A particularly suitable compound of the formula $R^1Y$ is isopropyl bromide. The reaction involving a compound of the formula $R^1Y$ may conveniently be carried out in the presence of a base, for example sodium or potassium carbonate, in a diluent or solvent, for example ethanol or isopropanol, at an elevated temperature, for example at the boiling point of the diluent or solvent.

Suitable reducing conditions for the reaction involving the carbonyl compound are those provided by the presence of hydrogen and a hydrogenation catalyst, for example palladium or platinum, in an inert diluent or solvent, for example in one or more solvents selected from water, ethanol and an excess of the carbonyl compound used as starting material; or by the presence of an alkali metal borohydride, for example sodium borohydride or lithium cyanoborohydride, in an inert diluent or solvent, for example in one or more solvents selected from water, ethanol, methanol and an excess of the carbonyl compound used as starting material. It is to be understood that when in the starting material $R^2$ stands for the cyano radical, or $R^3$ stands for a halogen atom or for an alkenyl or alkenyloxy radical, hydrogen and a hydrogenation catalyst are preferably not used to provide the reducing conditions, in order to prevent the radical $R^2$ or $R^3$ from being affected by catalytic hydrogenation.

(e) A compound wherein either or both of $R^5$ and $R^6$ stands for a protecting group may be prepared by the series of reactions described under (a) or (b) or (c) or (d) above. Alternatively, a suitable protecting group may be introduced by conventional means into an intermediate compound at any stage preceding the final stage.

A suitable value for $R^4$ when it stands for a protecting group is, for example, a hydrogenolysable radical, for example an α-arylalkyl, α-arylalkoxy-carbonyl or α-arylalkoxymethyl radical, for example the benzyl, benzyloxycarbonyl or benzyloxymethyl radical.

A suitable value for $R^5$ when it stands for a protecting group is, for example, a hydrogenolysable radical as defined for $R^4$, or an acyl radical, for example an alkanoyl radical of up to 20 carbon atoms or an aroyl radical of up to 10 carbon atoms, or an α-alkoxyalkyl radical (that is, a radical which forms with the oxygenated three-carbon radical an acetal radical), for example the tetrahydropyranyl radical.

A suitable value for $R^6$ when it stands for a protecting group is, for example, a hydrogenolysable radical as defined for $R^4$, or an acyl radical as defined for $R^5$, or a carbamoyl radical, for example a radical of the formula —$CONHR^1$, wherein $R^1$ has the meaning stated above. Alternatively, $R^5$ and $R^6$ may be joined together so that one protecting group serves to protect both the oxygen and nitrogen atoms. Such a protecting group may be, for example, the carbonyl (—CO—) radical, such that it forms, together with the adjacent oxygen and nitrogen atoms and two carbon atoms of the three-carbon radical, an oxazolidinone nucleus, or it may be a radical of the formula —$CHR^9$—, wherein $R^9$ stands for hydrogen, or for an alkyl radical of up to 4 carbon atoms or an aryl radical of up to 10 carbon atoms, such that it forms, together with the adjacent oxygen and nitrogen atoms and two carbon atoms of the three-carbon radical, an oxazolidine nucleus.

The hydrogenolysable protecting group $R^4$ or $R^5$ or $R^6$ may be removed, for example, by catalytic hydrogenation, for example by hydrogenation in the presence of a palladium-on-charcoal catalyst, in an inert diluent or solvent, for example ethanol or aqueous ethanol. The process may be accelerated or completed by the presence of an acidic catalyst, for example hydrochloric or oxalic acid.

The acyl protecting group $R^5$ or $R^6$, or the carbamoyl protecting group $R^6$, or the carbonyl protecting group formed by $R^5$ and $R^6$ taken together, may be removed by hydrolysis in the presence of a base, for example an alkali metal hydroxide, in a diluent or solvent, for example water, methanol, ethanol or a mixture thereof.

The α-alkoxyalkyl protecting group $R^5$ or $R^6$, or the protecting group $R^9CH$— formed by $R^5$ and $R^6$ taken together, may be removed by hydrolysis in the presence of an acid, for example a mineral acid, for example aqueous hydrochloric acid, and the hydrolysis may be carried out at a temperature of up to 100° C.

A preferred process for the manufacture of the alkanolamine derivative of the invention comprises the reaction of a compound of the formula:

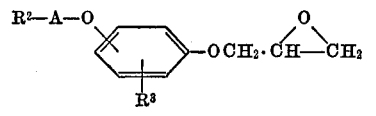

or

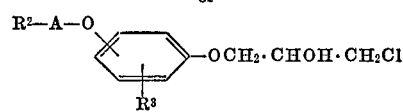

wherein $R^2$, $R^3$ and A have the meanings stated above (both of which compounds may be obtained by the reaction of the corresponding phenol with epichlorohydrin), with an amine of the formula $R^1NH_2$, wherein $R^1$ has the meaning stated above.

Optically-active enantiomorphs of the alkanolamine derivative of the invention may be obtained by the resolution by conventional means of the corresponding racemic alkanolamine derivative of the invention.

The said resolution may be carried out by reacting the racemic alkanolamine derivative with an optically-active acid, followed by fractional crystallisation of the diastereoisomeric mixture of salts thus obtained from a diluent or solvent, for example ethanol, whereafter the optically-active alkanolamine derivative is liberated from the salt by treatment with a base. A suitable optically-active acid is, for example, (+)- or (—)-O,O-di-p-toluoyltartaric acid.

The resolution process may be facilitated by treating the partially resolved alkanolamine derivative in free base form obtained after a single fractional crystallisation of the diastereoisomeric mixture of salts with a solubilising agent, for example a primary amine, for example allylamine, in a relatively non-polar diluent or solvent, for example petroleum ether.

The alkanolamine derivative of the invention in free base form may be converted into an acid-addition salt thereof by reaction with an acid by conventional means.

As stated above, the alkanolamine derivative of the invention and acid-addition salts thereof possess β-adrenergic blocking activity. This acitivity may be determined by the reversal of isoprenaline-induced tachycardia in rats or cats, a standard test for the determination of β-adrenergic blocking activity. The preferred alkanolamine derivatives of the invention are two to five times more active as β-adrenergic blocking agents than practolol. At doses of an alkanolamine derivative of the invention which produce effective β-adrenergic blockage in rats or cats, no symptoms of toxicity are apparent.

Furthermore, some of the alkanolamine derivatives of the invention possess selective β-adrenergic blocking activity, as demonstrated by relative freedom from antagonism of isoprenaline-induced vasodilatation in cats or of the relief produced by isoprenaline of histamine-induced bronchospasm in guinea-pigs. Compounds exhibiting this selective action show a greater degree of specificity in blocking the cardiac β-receptors than the β-receptors in peripheral blood vessels and bronchial muscle. Thus, a dose may be selected for such a compound at which the compound blocks the cardiac inotropic and chronotropic actions of a catecholamine [for example isoprenaline, that is, 1-(3,4-dihydroxyphenyl)-2-isopropylaminoethanol] but does not block the relaxation of tracheal smooth muscle produced by isoprenaline or the peripheral vasodilator action of isoprenaline. Because of this selective action, one of these compounds may advantageously be used together with a sympathomimetic bronchodilator, for example isoprenaline, orciprenaline, adrenaline or ephedrine, in the treatment of asthma and other abstructive air ways diseases, inasmuch as the selective compound will substantially inhibit the unwanted stimulatory effects of the bronchodilator on the heart but will not hinder the desirable therapeutic effect of the bronchodilator.

The alkanolamine derivative of the invention may be administered to warm-blooded animals, including man, in the form of a pharmaceutical composition comprising as active ingredient at least one alkanolamine derivative of the invention, or an acid-addition salt thereof, in association with a pharmaceutically-acceptable diluent or carrier therefor.

A suitable composition is, for example, a tablet, capsule, aqueous or oily solution or suspension, emulsion, injectable aqueous or oily solution or suspension, dispersible powder, spray or aerosol formulation.

The pharmaceutical composition may contain, in addition to the alkanolamine derivative of the invention, one or more drugs selected from sedatives, for example phenobarbitone, meprobamate, chloropromazine and the benzodiazepine sedative drugs, for example chlordiazepoxide and diazepam; vasodilators, for example glyceryl trinitrate, pentaerythritol tetranitrate and isosorbide dinitrate; diuretics, for example chlorothiazide; hypotensive agents, for example reserpine, bethanidine and guanethidine; myocardial depressants, for example quinidine; agents used in the treatment of Parkinson's disease, for example benzhexol; cardiotonic agents, for example digitalis preparations; and sympathomimetic bronchodilators, for example isoprenaline, orciprenaline, adrenaline and ephedrine.

When used for the treatment of heart diseases, for example angina pectoris and cardiac arrhythmias, or for the treatment of hypertension, in man it is expected that the alkanolamine derivative would be given to man at a total oral dose of between 20 mg. and 600 mg. daily, at doses spaced at 6–8 hourly intervals, or at an intravenous dose of between 1 mg. and 20 mg. Preferred oral dosage forms are tablets or capsules containing between 10 and 100 mg., and preferably 10 mg. or 40 mg. of active ingredient. Preferred intravenous dosage forms are sterile aqueous solutions of the alkanolamine derivative or of a non-toxic acid-addition salt thereof, containing between 0.05% and 1% w./v. of active ingredient, and more particularly containing 0.1% w./v. of active ingredient.

The invention is illustrated but not limited by the following examples:

EXAMPLE 1

A mixture of 3-(p-hydroxyphenoxy)propyl cyanide (1.3 g.), water (50 ml.), sodium hydroxide (0.35 g.) and epichlorohydrin (20 ml.) is stirred at laboratory temperature for 24 hours. Chloroform (20 ml.) is added and the organic layer is separated, washed with water, dried and evaporated to dryness.

A mixture of the epoxide thus obtained (1.0 g.) and isopropylamine (40 ml.) is heated at 95–100° C. for 24 hours. The mixture is evaporated to dryness and the residue is partitioned between chloroform (40 ml.) and aqueous 2 N-hydrochloric acid (40 ml.). The aqueous acidic layer is separated and made alkaline with solid sodium carbonate and the mixture is extracted twice with chloroform (40 ml. each time). The combined extracts are dried and evaporated to dryness under reduced pressure, and the residual oily free base is converted into the oxalate thereof by reaction with oxalic acid in ethereal solution. The salt is crystallised from acetone and there is thus obtained 1-p-(3-cyanopropoxy)phenoxy-3-isopropylamino-2-propanol hydrogen oxalate, M.P. 91–94° C.

EXAMPLE 2

The process described in Example 1 is repeated except that 1-(p-hydroxyphenoxy)acetone is used in place of 3-(p-hydroxyphenoxy)propyl cyanide and t-butylamine is used in place of isopropylamine, and that the mixture of epoxide and t-butylamine is kept at laboratory temperature for 60 hours. There is thus obtained 1-p-(2-oxopropoxy)phenoxy-3-t-butylamino-2-propanol oxalate, M.P. 199–202° C. (crystallised from ethanol).

EXAMPLE 3

A mixture of 4-(p-hydroxyphenoxy)butyl cyanide (1.65 g.), epichlorohydrin (10 ml.) and a trace of piperidine is heated under reflux for 17 hours, and the piperidine and excess of epichlorohydrin are removed by evaporation under reduced pressure. The oily residue, which consists of a mixture of 1,2-epoxy-3-p-(4-cyanobutoxy)phenoxypropane and 1-chloro-3-p-(4-cyanobutoxy)phenoxy-2-propanol, is dissolved in a mixture of n-propanol (25 ml.) and isopropylamine (10 ml.) and the solution is heated under reflux for 17 hours and then evaporated to dryness. The residue is extracted with warm aqueous 2N-hydrochloric acid (50 ml.) and the extract is washed twice with methylene chloride (100 ml. each time), basified with aqueous 2N-sodium hydroxide solution and extracted three times with methylene chloride (100 ml. each time). The combined extracts are dried and evaporated to dryness and the residue is dissolved in ethyl acetate. A solution of oxalic acid in ethyl acetate is added, the mixture is filtered and the solid residue is crystallised from ethanol. There is thus obtained 1-p-(4-cyanobutoxy)phenoxy-3-isopropylamino-2-propanol oxalate, M.P. 160–161° C.

EXAMPLE 4

The process described in Example 3 is repeated except that the appropriate amine is used in place of isopropylamine, and there are thus obtained 1-p-(4-cyanobutoxy)phenoxy-3-t-butylamino-2-propanol oxalate, M.P. 191–193° C.; 1-p-(4-cyanobutoxy)phenoxy - 3 - cyclopropylamino-2-propanol oxalate, M.P. 120–122° C.; and 1-p-(4-cyanobutoxy)phenoxy - 3 - (1,1 - dimethyl-2-hydroxyethyl)amino-2-propanol oxalate, M.P. 110–112° C.

EXAMPLE 5

The process described in Example 1 is repeated except that the appropriate phenol is used in place of 3-(p-hydroxyphenoxy)propyl cyanide, and there are thus obtained 1-p-(5-cyanopentyloxy)phenoxy-3-isopropylamino-2-propanol hydrogen oxalate, M.P. 139–141° C.; 1-[4-(3 - cyanopropoxy) - 2 - methoxyphenoxy]-3-isopropylamino-2-propanol (an oil from which no crystalline salt has been obtained but the structure of which is confirmed by proton magnetic resonance spectroscopy and mass spectroscopy); and 1-[2-bromo-4-(4-cyanobutoxy)phenoxy]-3-isopropylamino-2-propanol oxalate, M.P. 97–100° C.

The various phenols used as starting materials may be obtained as follows:

5-(p-hydroxyphenoxy)pentyl cyanide

A mixture of p-benzyloxyphenol, 5-bromopentyl cyanide and sodium ethoxide is heated under reflux in ethanol solution for 3 hours. There is thus obtained 5-(p-benzyloxyphenoxy)pentyl cyanide, M.P. 72–75° C. A solution of this compound in ethanol is shaken with hydrogen in the presence of a 5% palladium-on-carbon catalyst at laboratory temperature and atmospheric pressure. There is thus obtained 5-(p-hydroxyphenoxy)pentyl cyanide, M.P. 62–63° C. after crystallisation from toluene.

3-(4-hydroxy-3-methoxyphenoxy)propyl cyanide

This compound, M.P. 59–60° C. after crystallisation from a mixture of toluene and light petroleum, may be obtained from 3-methoxy-4-benzyloxyphenyl and 3-bromopropyl cyanide in a similar manner to that described in the preceding paragraph. The intermediate 3-(4-benzyloxy-3-methoxyphenoxy)propyl cyanide has M.P. 69–70° C. after crystallisation from ethanol.

4-(3-bromo-4-hydroxyphenoxy)butyl cyanide 4-(p-hydroxyphenoxy)butyl cyanide is brominated with bromine in methylene chloride solution at laboratory temperature. There is thus obtained 4 - (3-bromo-4-hydroxyphenoxy)butyl cyanide, M.P. 66° C. after crystallisation from ethanol.

EXAMPLE 6

The process described in Example 1 is repeated except that 3-(o-hydroxyphenoxy)propyl cyanide is used in place of 3-(p-hydroxyphenoxy)propyl cyanide. There is thus obtained 1-o-(3-cyanopropoxy)phenoxy - 3 - isopropylamino-2-propanol, M.P. 86–87° C. after crystallisation from ethanol.

The 3-(o-hydroxyphenoxy) propyl cyanide (M.P. 68–70° C. after crystallisation from ethanol) used as starting material may be obtained from o-benzyloxyphenol and 3-bromopropyl cyanide, followed by hydrogenolysis of the intermediate compound obtained, by a similar process to that described in the second part of Example 5.

EXAMPLE 7

The process described in Example 1 is repeated except that 3-(m-hydroxyphenoxy)propyl cyanide is used in place of 3-(p-hydroxyphenoxy)propyl cyanide. There is thus obtained 1-m-(3-cyanopropoxy)phenoxy-3-isopropylamino-2-propanol hydrogen oxalate, M.P. 131–132° C. after crystallisation from ethanol.

The 3-(m-hydroxyphenoxy)propyl cyanide (M.P. 73–74° C. after crystallization from water) used as starting material may be obtained by the reaction of resorcinol with 3-bromopropyl cyanide in acetone solution in the presence of anhydrous potassium carbonate and a trace of potassium iodide.

What we claim is:

1. An alkanolamine derivative selected from compounds of the formula:

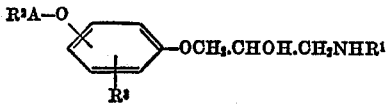

wherein $R^1$ is alkyl, hydroxyalkyl or cycloalkyl each of up to 6 carbon atoms; wherein $R^2$ is cyano; wherein $R^3$ is hydrogen, halogen or alkyl, alkenyl, alkoxy or alkenyloxy each of up to 6 carbon atoms; and wherein A is alkylene of up to 6 carbon atoms; and the non-toxic, pharmaceutically-acceptable acid- addition salts thereof.

2. An alkanolamine derivative as claimed in claim 1 selected fro mcompounds of the formula given in claim 1 wherein $R^1$ is isopropyl, s-butyl, t-butyl, 2-hydroxy-1-methylethyl, 2 - hydroxy-1,1-dimethylethyl, cyclopropyl, cyclobutyl, cyclopentyl or cyclohexyl, wherein $R^2$ is cyano, wherein $R^3$ is hydrogen, fluorine, chlorine, bromine, iodine, methyl, ethyl, n-propyl, allyl, methoxy, isopropoxy or allyloxy, and wherein A is methylene, trimethylene, tetramethylene, pentamethylene or ethylidene and the non-toxic, pharmaceutically-acceptable acid-addition salts thereof.

3. An alkanolamine derivative as claimed in claim 1 selected from compounds of the formula given in claim 1 wherein $R^7$ is isopropyl or t-butyl, $R^2$ is cyano, $R^3$ is hydrogen and A is straight-chain alkylene of 3 to 5 carbon atoms, or a non-toxic pharmaceutically-acceptable acid-addition salt thereof.

4. The compound claimed in claim 1 which is 1-o-(3-cyanopropoxy)phenoxy-3-isopropylamino - 2 - propanol or a non-toxic, pharmaceutically-acceptable acid- addition salt thereof.

5. The compound claimed in claim 1 which is 1-m-(3-cyanopropoxy)phenoxy-3-isopropylamino-2-propanol or a non-toxic, pharmaceutically-acceptable acid-addition salt thereof.

6. The compound claimed in claim 1 which is 1-p-(3-cyanopropoxy)phenoxy-3-isopropylamino - 2 - propanol or a non-toxic pharmaceutically-acceptable acid-addition salt thereof.

References Cited

UNITED STATES PATENTS 3,459,782   8/1969   Koppe et al. _____ 260—465
3,663,607   5/1972   Barrett et al. _____ 260—465 X LEWIS GOTTS, Primary Examiner D. H. TORRENCE, Assistant Examiner U.S. Cl. X.R.

260—79.3, 465 F, 501.17, 570.7; 424—304, 330